US012590632B2

(12) United States Patent
Hanneder et al.

(10) Patent No.: US 12,590,632 B2
(45) Date of Patent: Mar. 31, 2026

(54) MODULAR SHIFTING SYSTEM

(71) Applicant: ArvinMeritor Technology, LLC, Troy, MI (US)

(72) Inventors: Michael Hanneder, Troy, MI (US); Silvia Grünwald, Troy, MI (US); Christian Grosstesner, Troy, MI (US); Johannes Bernoegger, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/630,668

(22) Filed: Apr. 9, 2024

(65) Prior Publication Data

US 2024/0376980 A1     Nov. 14, 2024

(30) Foreign Application Priority Data

May 9, 2023     (EP) ...................................... 23172174

(51) Int. Cl.
*F16H 63/32*        (2006.01)
*F16H 63/30*        (2006.01)

(52) U.S. Cl.
CPC ......... *F16H 63/32* (2013.01); *F16H 63/3023* (2013.01); *F16H 63/304* (2013.01); *F16H 2063/3056* (2013.01)

(58) Field of Classification Search
CPC .... F16H 63/32; F16H 63/3023; F16H 63/304; F16H 2063/3056; F16H 2061/307; F16H 2063/005; F16H 63/065; F16H 63/18; F16H 61/30; F16H 61/32; F16H 2061/308; F16H 2200/0039; F16H 61/0204
See application file for complete search history.

(56) References Cited

U.S. PATENT DOCUMENTS

| | | | | |
|---|---|---|---|---|
| 5,517,876 A | * | 5/1996 | Genise | ................. F16H 63/304 |
| | | | | 192/109 A |
| 5,842,947 A | | 12/1998 | Weilant | |
| 10,808,768 B2 | * | 10/2020 | Creech | ................... F16H 63/32 |
| 2023/0075508 A1 | | 3/2023 | Peterson et al. | |

FOREIGN PATENT DOCUMENTS

| | | |
|---|---|---|
| DE | 102016006751 A1 | 12/2017 |
| WO | 2005/085683 A1 | 9/2005 |
| WO | 2015/144147 A1 | 10/2015 |

OTHER PUBLICATIONS

Extended European Search Report dated Feb. 1, 2024 for related European Appln. No. 23172174.7, 18 pages.
Partial European Search Report dated Dec. 4, 2023 for related European Appln. No. 23172174.7, 14 pages.

* cited by examiner

*Primary Examiner* — Ictor L Macarthur
(74) *Attorney, Agent, or Firm* — Brooks Kushman PC

(57)     ABSTRACT

A modular shifting system is provided. The modular shifting system comprises a transmission including an input shaft and an output shaft, a transmission housing, gear trains accommodated in the transmission housing and constituting at least two shiftable gear ratios for establishing a transmission ratio between the output shaft and the input shaft, and a shift device for shifting between the at least two gear ratios. The shift device is detachably attached to the transmission housing. The shift device is one of an electrically actuated shift device and a pneumatically actuated shift device. The modular shifting system is configured such that the electrically actuated shift device is interchangeable with the pneumatically actuated shift device and vice versa.

14 Claims, 3 Drawing Sheets

MODULAR SHIFTING SYSTEM

CROSS-REFERENCE TO RELATED APPLICATIONS

This application claims the benefit of European patent application no. 23172174, filed May 9, 2023, the disclosure of which is hereby incorporated in its entirety by reference herein.

TECHNICAL FIELD

The present invention relates to a modular shifting system. In addition, the present invention relates to a pneumatically actuated shift device for the modular shifting system.

BACKGROUND

A shifting system includes a transmission providing different gear ratios between an output shaft and an input shaft and a shift device for shifting between the different gear ratios of the transmission. Generally, the use of both an electrically actuated shift device and a pneumatically actuated shift device for the shifting system is known. The selection of either the electrically actuated shift device or the pneumatically actuated shift device depends on various factors such as the intended use of the shifting system, customer requirements, etc. Due to the different designs and dimensions of the differently actuated shift devices, the selection of the shift device influences the design of the transmission (and/or the transmission housing), the required installation space of the transmission, and the arrangement of surrounding components, e.g., in a vehicle chassis or a vehicle body. The selection of the shift device must therefore be made early in the manufacturing process, which reduces the flexibility. Moreover, the selection of the shift device affects the design and arrangement of adjacent components, which increases the number of different components required and conflicts with the need to achieve the most efficient manufacturing process. In order to make the manufacturing process cost-effective, it is desirable to reduce the number of different components required.

Therefore, there is a need for a shifting system which provides a high degree of flexibility during the manufacturing process and can be manufactured more cost-effectively.

In view of the above, it is the object of the present invention to provide a shifting system which has a high degree of flexibility during the manufacturing process and can be manufactured in a cost-effective manner.

SUMMARY

The object is achieved by a modular shifting system having the features of independent claim 1. A pneumatically actuated shift device for the modular shifting system according to the invention is the subject-matter of claim 5. Further advantageous developments are set out in the dependent claims.

According to the invention, a modular shifting system includes a shift device for shifting between at least two gear ratios, which is detachably attached to a transmission housing. The shift device is one of an electrically actuated shift device and a pneumatically actuated shift device and the modular shifting system is configured such that the electrically actuated shift device is interchangeable with the pneumatically actuated shift device and vice versa.

Therefore, since the electrically and the pneumatically actuated shift devices can be detachably attached to the transmission housing and are interchangeable with each other, the selection of the shift device does not affect the design of the transmission and/or the transmission housing of the shifting system. As a result, the number of different components required can be reduced, which makes the manufacturing process more cost-effective. Moreover, the selection of the shift device can be made later in the manufacturing process facilitating the adaption of the shifting system to customer and market requirements. Consequently, the manufacturing process can be made more flexible.

The dimensions of a housing of the electrically actuated shift device may substantially be equal to the dimensions of a housing of the pneumatically actuated shift device.

Therefore, an installation space required for the modular shifting system is independent of the shift device selection. As a result, the selection of the shift device does not affect the installation space of the modular shifting system and the influence on the arrangement of surrounding components, e.g., in a vehicle chassis or a vehicle body, can be reduced. This allows the selection of the shift device to be made later in the manufacturing process, making the manufacturing process more flexible.

The transmission may include a first shift fork axially shiftable by axially shifting a first follower and a second shift fork axially shiftable by axially shifting a second follower. The first follower and the second follower may be exposed to the outside of the transmission housing. Both the electrically actuated shift device and the pneumatically actuated shift device may include shifting means positioned so as to be able to axially shift the first follower and the second follower.

As a result, the selection of the shift device does not affect the design of the transmission of the shifting system, in particular, the design and the arrangement of the followers intended for the communication with the shift device. As a result, the number of different components required can be reduced, which makes the manufacturing process more cost-effective. Moreover, the manufacturing of the transmission is not affected by the selection of the shift device. Thus, the manufacturing process can be made more flexible.

Further benefits and advantages of the present invention will become apparent from the following detailed description of at least one exemplary embodiment for carrying out the present invention with reference to the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An embodiment of the present invention is described below with reference to FIGS. 1 to 3.

Figure 1:
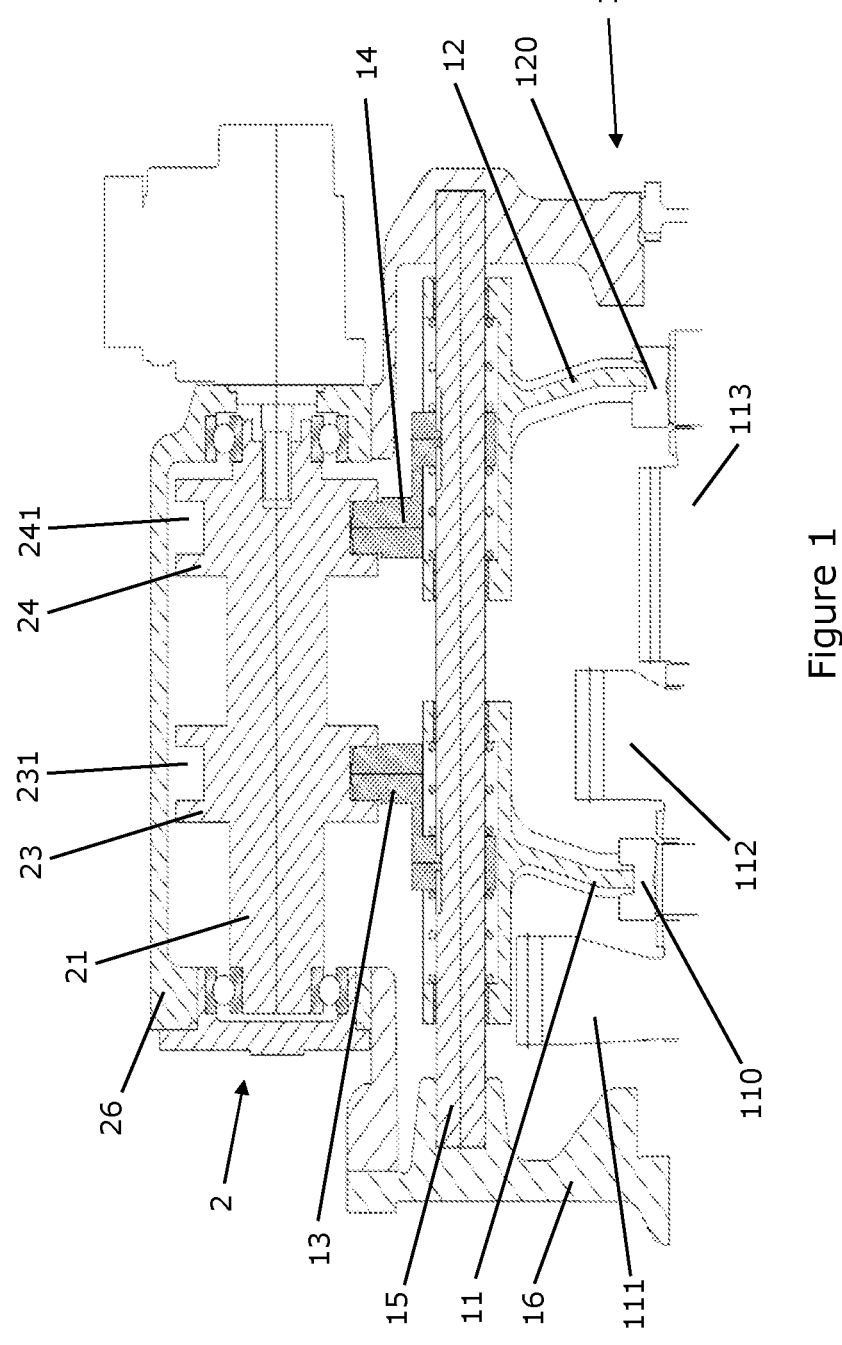
FIG. 1 is a schematic sectional view of a modular shifting system according to an embodiment of the present invention having an electrically actuated shift device attached to a transmission housing.

FIG. 1 illustrates a schematic sectional view of the modular shifting system having an electrically actuated shift device 2 attached to a transmission housing 16. FIG. 2 illustrates a schematic sectional view of the modular shifting system having a pneumatically actuated shift device 3 attached to a transmission housing 16.

The modular shifting system comprises a transmission 1. The transmission 1 includes an input shaft (not shown in the figures) configured to be connected to a drive source, such as an engine or motor, and an output shaft (not shown in the figures) configured to be connected to driven components, such as wheels of a vehicle. The input shaft and the output shaft are accommodated in and rotatably supported by the transmission housing 16.

The transmission 1 further includes multiple (three in the present embodiment shown in the figures) gear trains accommodated in the transmission housing 16 and selectively transmitting torque from the input shaft to the output shaft. Generally, the gear trains provide different gear ratios for establishing a transmission ratio between the output shaft and the input shaft. Each of the gear train is constituted, for example, by a gear provided on the input shaft and a gear provided on the output shaft meshing with the gear provided on the input shaft. The gear provided on the input shaft is axially fixed and rotatably supported on the input shaft. The gear can be rotationally locked to the input shaft by an engagement with a dog clutch provided on the input shaft. The dog clutch is rotationally locked to the input shaft but axially movable relative to the input shaft. Thus, the dog clutch is allowed to engage and disengage with the gear by axially reciprocating on the input shaft relative to the gear. An axial movement of the dog clutch is caused by a shift fork linked to the dog clutch. The shift fork is axially movably supported on a sliding rod 15. The shift fork is coupled to a follower via a spring mechanism (so called "blocker spring"). By axially shifting the follower, the shift fork is axially shifted, and the dog clutch coupled to the shift fork is engaged with or disengaged from the gear. The spring mechanism is capable to temporarily compensate the shifting movement of the follower when the dog clutch is prevented from shifting during the engagement process with the gear, for example, due to a tooth-to-tooth position with the gear, or during the disengagement process with the gear, for example, due to torque still acting on the engagement between the dog clutch and the gear. In this way, the spring mechanism serves to prevent overloading of an actuator that drives the axial movement of the follower.

According to the present exemplary embodiment shown in FIG. 1, the transmission 1 includes a first gear 111, a second gear 112, and a third gear 113. The first gear 111 and the second gear 112 can be rotationally locked to the input shaft by means of a first dog clutch 110. The third gear 113 can be rotationally locked to the input shaft by means of a second dog clutch 120. The first dog clutch 110 is linked to a first shift fork 11, and the second dog clutch 120 is linked to a second shift fork 12 axially movably supported on the sliding rod 15. The first shift fork 11 is axially shiftable by a first follower 13 supported on the sliding rod 15. The second shift fork 12 is axially shiftable by a second follower 14 supported on the sliding rod 15.

The first follower 13 and the second follower 14 are provided in the transmission housing 16 so as to be exposed to the outside of the transmission housing 16. Thus, the first and the second followers 13, 14 are axially shiftable by corresponding shifting means 23, 24, 33, 34 provided in the respective shift device 2, 3 attached to the transmission housing 16.

When the first follower 13 is axially shifted from a neutral position towards a first axial direction (i.e., to the left in FIGS. 1 and 2), the first shift fork 11 is shifted towards the first axial direction thereby moving the first dog clutch 110 from a neutral position, in which the first dog clutch 110 is disengaged with the first and second gears 111, 112, to a first engaged position, in which the first dog clutch 110 is engaged with the first gear 111. When the first follower 13 is axially shifted from a neutral position towards a second axial direction (i.e., to the right in FIGS. 1 and 2), the first shift fork 11 is shifted towards the second axial direction thereby moving the first dog clutch 110 from a neutral position, in which the first dog clutch 110 is disengaged with the first and second gears 111, 112, to a second engaged position, in which the first dog clutch 110 is engaged with the second gear 112. When the second follower 14 is axially shifted from a neutral position towards the first axial direction, the second shift fork 12 is shifted towards the first axial direction thereby moving the second dog clutch 120 from a neutral position, in which the second dog clutch 120 is disengaged with the third gear 113, to an engaged position, in which the second dog clutch 120 is engaged with the third gear 113.

As it is shown in FIG. 1, an electrically actuated shift device 2 can be attached to the transmission housing 16. The electrically actuated shift device 2 comprises an actuator, such as a stepper motor, which is capable of rotating a shifting shaft 21 of the shift device 2 by a specific rotation angle. The shifting shaft 21 is accommodated in and rotatably supported by a housing 26 of the shift device 2. The shifting shaft 21 is provided with a first shifting means 23 and a second shifting means 24. The first and second shifting means 23, 24 are formed in a disk-shaped manner protruding radially outwardly from the shifting shaft 21 and extending in a circumferential direction. Each of the shifting means 23, 24 comprises a circumferential recess 231, 241 radially recessed from a peripheral surface of the shifting means 23, 24 towards an axial center and extending in the circumferential direction. The circumferential recesses 231, 241 are formed to include inclined portions (not shown in the figures) that are inclined with respect to a plane perpendicular to the axial direction of the shifting shaft 21. The circumferential recesses 231, 241 of the first and the second shifting means 23, 24 are at least partially exposed to the outside through a correspondingly arranged opening in the housing 26 of the shift device 2.

The housing 26 of the electrically actuated shift device 2 can be fixed to the transmission housing 16 by fixing means such as screws. When the electrically actuated shift device 2 is attached to the transmission housing 16, the first follower 13 engages with the circumferential recess 231 of the first shifting means 23 and the second follower 14 engages with the circumferential recess 241 of the second shifting means 24. Therefore, when the first and second shifting means 23, 24 are rotated by actuation of the stepper motor, the first and second followers 13, 14 can be axially shifted by the inclined portions of the circumferential recesses 231, 241 engaged with the first and second followers 13, 14.

In the following, the shifting operation performed by the electrically actuated shift device 2 attached to the transmission housing 16 is described.

FIG. 1 shows the electrically actuated shift device 2 in a neutral position. That is, the first and second shifting means 23, 24 engaged with the first and second followers 13, 14, are positioned such that the first dog clutch 110 is not engaged with the first and second gears 111, 112 and the second dog clutch 120 is not engaged with the third gear 113.

When a shifting command is issued, for example, by a driver of a vehicle provided with the modular shifting system, the stepper motor is actuated and rotates by a specific rotation angle in a specific rotation direction. The rotation of the stepper motor causes the shifting shaft 21 and the first and second shifting means 23, 24 to rotate by the specific rotation angle in the specific rotation direction. While the first and second shifting means 23, 24 rotate, the first and second followers 13, 14 slide within the respective recess of the first and second shifting means 23, 24. When, for example, the first follower 13 sliding within the recess of the first shifting means 23 reaches one of the inclined portions of the recess, the first follower 13 is axially shifted by the rotating first shifting means 23. Along with the first follower 13, the first shift fork 11 is axially shifted, thereby moving the first dog clutch 110, e.g., from the neutral position to the first engaged position in which the dog clutch engages with the first gear 111. Thus, by appropriately arranging inclined portions of the recesses of the first and second shifting means 23, 24, depending on a specific rotational position approached by the stepper motor, the first dog clutch 110 can be engaged with either the first gear 111 or the second gear 112, and the second dog clutch 120 can be engaged with the third gear 113.

Figure 2:
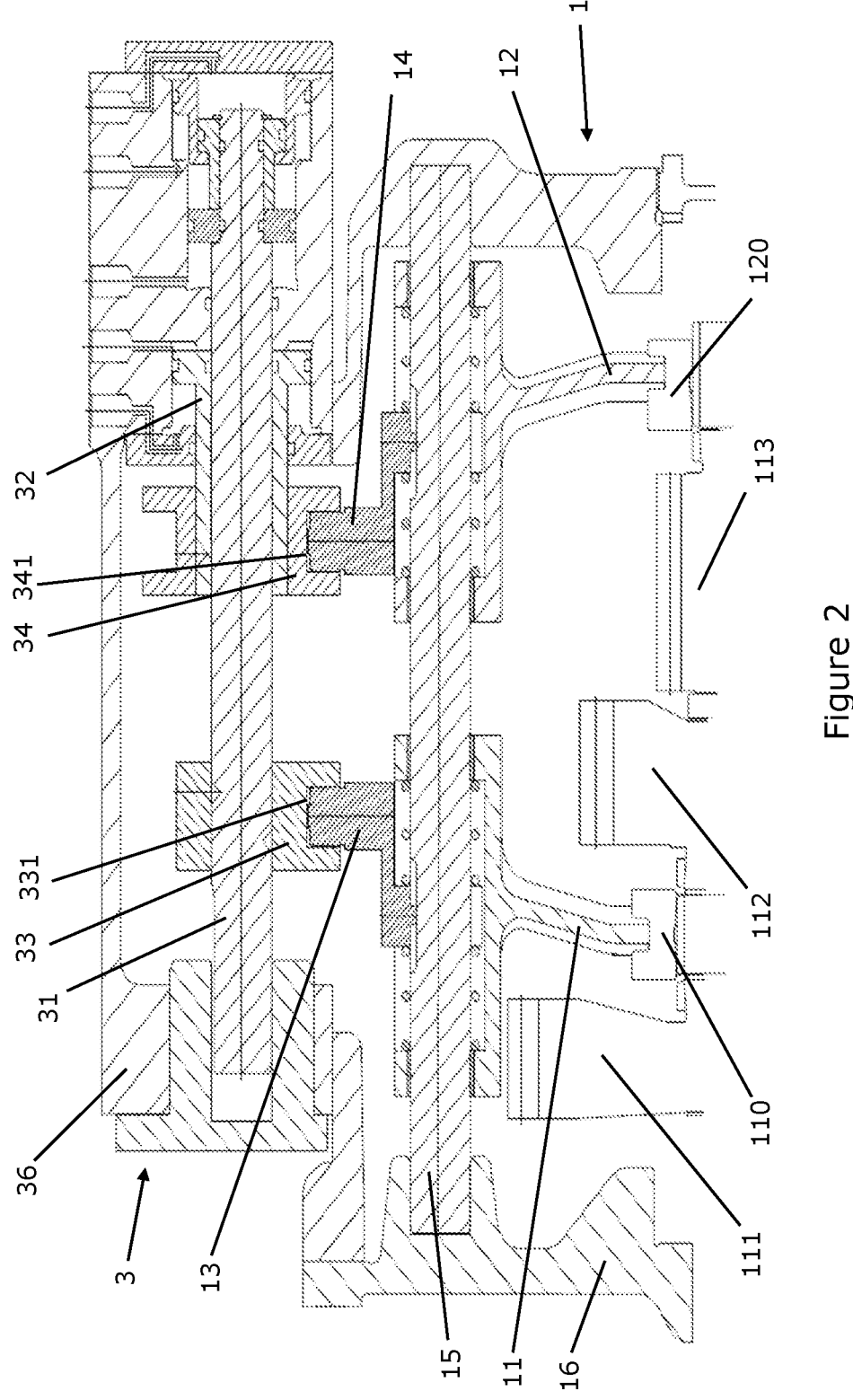
FIG. 2 is a schematic sectional view of the modular shifting system of FIG. 1 having a pneumatically actuated shift device attached to the transmission housing.

As it is shown in FIG. 2, a pneumatically actuated shift device 3 can be attached to the transmission housing 16. Similar to the electrically actuated shift device 2, the pneumatically actuated shift device 2 also comprises a first shifting means 33 engaging with the first follower 13 of the transmission 1 and a second shifting means 34 engaging with the second follower 14 of the transmission 1. However, the shifting of the first and second followers 13, 14 is not caused by rotation but by axial translation of the first and second shifting means 33, 34 in the axial direction. In particular, the first and second shifting means 33, 34 of the pneumatically actuated shift device 3 are reciprocated in the axial direction.

The pneumatically actuated shift device 3 includes a first shift rod 31 and a second shift rod 32. The first shift rod 31 is radially supported by a housing 36 of the pneumatically actuated shift device 3 so as to be slidably movable in an axial direction with respect to the housing 36. That is, the first shift rod 31 is shiftable in a first axial direction (e.g., to the left in FIGS. 2 and 3) and in a second axial direction (e.g., to the right in FIGS. 2 and 3) opposite to the first axial direction. The first shifting means 33 is fixed to the first shift rod 31 so as to move integrally with the first shift rod 31. The first shifting means 33 comprises a recessed portion 331 for engaging with the first follower 13.

The second shift rod 32 is radially supported by the first shift rod 31 so as to be slidably movable in the axial direction with respect to the housing 36 and the first shift rod 31. That is, the second shift rod 32 is shiftable in the first axial direction and in the second axial direction. In particular, the second shift rod 32 includes a central hollow portion penetrating the second shift rod 32 in the axial direction. The first shift rod 31 is inserted into the central hollow portion so as to axially penetrate the second shift rod 32. The second shifting means 34 is fixed to the second shift rod 32 so as to move integrally with the second shift rod 32. The second shifting means 34 comprises a recessed portion 341 for engaging with the second follower 14. The recessed portions 331, 341 of the first and the second shifting means 33, 34 are at least partially exposed to the outside through a correspondingly arranged opening in the housing 36 of the shift device 3. The housing 36 of the pneumatically actuated shift device 3 can be fixed to the transmission housing 16 by fixing means such as screws.

The housing 36 of the pneumatically actuated shift device 3 includes at an axial end portion in the second axial direction a first chamber 37 and a second chamber 38. The first chamber 37 is substantially formed as a blind hole opened in the second axial direction. The opening of the first chamber 37 is covered by a first cover 371 in an airtight manner. The second chamber 38 is substantially formed as a blind hole opened in the first axial direction. The opening of the second chamber 38 is covered by a second cover 381 in an airtight manner. A through hole extending in the axial direction is provided between the first chamber 37 and the second chamber 38. The first shift rod 31 is inserted into the through hole such that an axial end portion of the first shift rod 31 in the second axial direction is accommodated in the first chamber 37 and the first shift rod 31 passes through the second chamber 38 and a corresponding hole in the second cover 381.

The first shift rod 31 comprises a first piston member 311 and a second piston member 312, 313 arranged on the axial end portion of the first piston member 311 in the second axial direction. The first piston member 311 divides the first chamber 37 of the housing 36 into a first space S1 and a second space S2. The second piston member 312, 313 divides the first chamber 37 into the second space S2 and a third space S3. Pressurized air can be supplied to and discharged from the first space S1 by a first supply path, the second space S2 by a second supply path, and the third space S3 by a third supply path.

An axial end side of the first piston member 311 in the first axial direction abuts on a step provided on the first shift rod 31. An outer peripheral surface of the first piston member 311 slidably contacts an inner peripheral surface of the first chamber 37 so as to separate the first space S1 and the second space S2 in an airtight manner.

The second piston member 312, 313 comprises an inner piston element 312 and an outer piston element 313 positioned on a radially outer side of the inner piston element 312. The inner piston element 312 is substantially formed by a sleeve having a flange on the axial end side in the second axial direction projecting radially outward. The inner piston element 312 (in particular, an axially end surface of the inner piston element 312 in the first axial direction) abuts the first piston member 311. The first piston member 311 and the inner piston element 312 are axially fixed to the first shift rod 31 by, for example, a retaining ring. That is, the inner piston element 312 is sandwiched between the first piston member 311 and the retaining ring.

The outer piston element 313 is substantially formed by a sleeve having a flange on the axial end side in the second axial direction projecting radially outward and a ring-shaped hook portion on the axial end side in the first axial direction projecting radially inward. The inner piston element 312 is inserted into the outer piston element 313 such that an inner peripheral surface of the outer piston element 313 slides on an outer peripheral surface of the flange of the inner piston element 312 and an inner peripheral surface of the hook portion slides on an outer peripheral surface of the inner piston element 312. Thus, the axial movement of the outer piston element 313 in the second axial direction relative to the inner piston element 312 is restricted by the hook portion abutting the flange of the inner piston element 312. Further, the axial movement of the outer piston element 313 in the first axial direction relative to the inner piston element 312 is restricted by the hook portion abutting the first piston member 311 (the axial end side of the first piston member 311 in the second axial direction). An outer peripheral surface of the flange of the outer piston element 313 slidably contacts an inner peripheral surface of the first chamber 37 so as to separate the second space S2 and the third space S3 in an airtight manner.

The second shift rod 32 is substantially formed by a sleeve having a flange on the axial end side in the second axial direction projecting radially outward. An axial end portion of the second shift rod 32 in the second axial direction including the flange is inserted into the second chamber 38. The second shift rod 32 passes through the second cover 381 so that the axial end portion of the second shift rod 32 in the first axial direction projects from the second chamber 38. The second shifting means 34 is fixed to the axial end portion of the second shift rod 32 in the first axial direction projecting from the second chamber 38. An outer peripheral surface of the flange of the second shift rod 32 slidably contacts an inner peripheral surface of the second chamber 38 so as to divide the second chamber 38 into a fourth space S4 and a fifth space S5 and to separate the fourth space S4 and the fifth space S5 in an airtight manner. Pressurized air can be supplied to and discharged from the fourth space S4 by a fourth supply path and the fifth space S5 by a fifth supply path.

Figure 3:
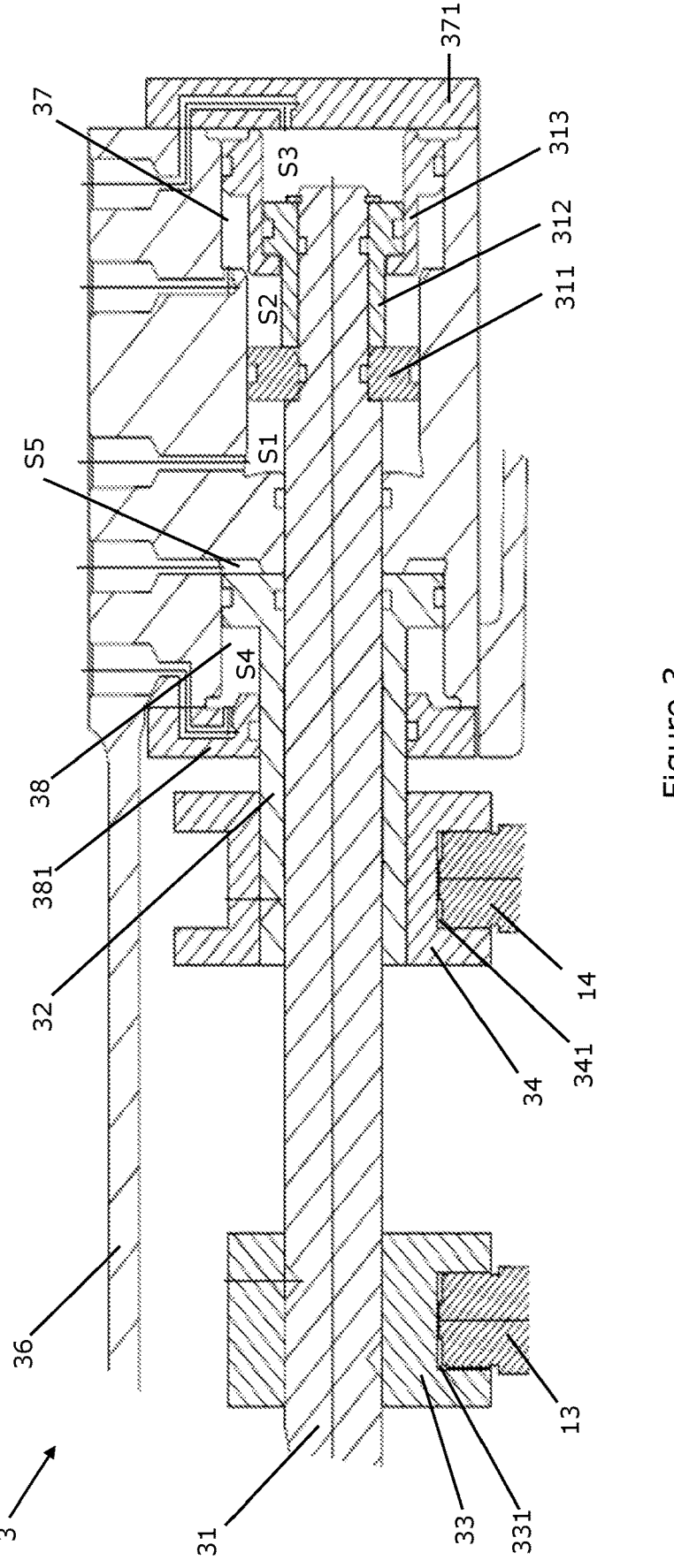
FIG. 3 is a partial schematic sectional view of the pneumatically actuated shift device of FIG. 2.

FIGS. 2 and 3 show the pneumatically actuated shift device 3 in a neutral position. That is, the first and second shifting means 33, 34 engaged with the corresponding one of the first and second followers 13, 14, are positioned such that the first dog clutch 110 is not engaged with the first and second gears 111, 113 and the second dog clutch 120 is not engaged with the third gear 113.

When the first shift rod 31 is in a position corresponding to the neutral position of the shift device 3, an axial end surface of the second piston member 312, 313 in the second axial direction, in particular, an axial end surface of the outer piston element 313 in the second axial direction, abuts the first cover 371 of the first chamber 37. At the same time, the hook portion of the outer piston element 313 abuts the flange of the inner piston element 312 (see FIGS. 2 and 3).

When the second shift rod 32 is in a position corresponding to the neutral position of the shift device 3, the flange of the second shift rod 32, in particular, an axial end surface of the flange in the second axial direction, abuts an axial end surface of the second chamber 38.

When a shifting command is issued, for example, by a driver of a vehicle provided with the modular shifting system, pressurized air is supplied to one or more of the first to fifth spaces S1 to S5 via the supply paths, to shift the first and second shift rod 31, 32 in the axial direction. The supply of pressurized air is controlled, for example, by corresponding solenoid valves. The solenoid valves can be directly integrated on the housing 36 of the pneumatically actuated shift device 3.

When pressurized air is supplied to the third space S3 via the third supply path and the first and second spaces S2, S3 are unpressurized, an axial force in the first axial direction is exerted on the second piston member 312, 313. Thus, the first shift rod 31 is shifted in the first axial direction until the first piston member 311 abuts an axial end surface of the first chamber 37. Consequently, the first shifting means 33 fixed to the first shift rod 31 shifts the first follower 13 in the first axial direction. As a result, the first shift fork 11 of the transmission 1 is shifted in the first axial direction and the first dog clutch 110 is engaged with the first gear 111.

When pressurized air is supplied to the first space SI via the first supply path and the second and third spaces S2, S3 are unpressurized, an axial force in the second axial direction is exerted on the first piston member 311. Thus, the first shift rod 31 is shifted in the second axial direction until the axial end surface of the first shift rod 31 in the second axial direction abuts the first cover 371 of the first chamber 37 or, as an alternative, an axial end surface of the first piston member 311 in the second axial direction abuts an axial end surface of the outer piston element 313 in the first axial direction. When the first shift rod 31 is shifted in the second axial direction, the inner piston element 312 of the second piston member 312, 313, which is fixed to the first shift rod 31, is axially moved relative to the outer piston element 313 abutting the first cover 371. Consequently, the first shifting means 33 fixed to the first shift rod 31 shifts the first follower 13 in the second axial direction. As a result, the first shift fork 11 of the transmission 1 is shifted in the second axial direction and the first dog clutch 110 is engaged with the second gear 112.

When pressurized air is supplied to the second space S2 via the second supply path and the first and third spaces S1, S3 are unpressurized, an axial force in the first axial direction is exerted on the first piston member 311 and an axial force in the second axial direction is exerted on the second piston member 312, 313, in particular, on the outer piston element 313 of the second piston member 312, 313. The axial force exerted on the first piston member 311 urges the first shift rod 31 in the first axial direction. The axial force exerted on the outer piston element 313 of the second piston member 312, 313 urges the outer piston clement 313 in the second axial direction. Therefore, the outer piston element 313 is shifted relative to the inner piston element 312 until the hook portion of the outer piston element 313 abuts the flange of the inner piston clement 312. When the hook portion of the outer piston element 313 abuts the flange of the inner piston element 312, the axial force exerted on the outer piston element 313 of the second piston member 312, 313 urges the first shift rod 31 in the second axial direction. Since the surface of the outer piston element 313 exposed to the pressure within the space S2 is larger than the surface of the first piston member 311 exposed to the pressure within the space S2, the axial force urging the first shift rod 31 to the second axial direction is larger than the axial force urging the first shift rod 31 to the first axial direction. As a result, the first shift rod 31 is returned to the position corresponding to the neutral position of the shift device 3 and the first dog clutch 110 is disengaged with the first gear 111 or the second gear 112.

When pressurized air is supplied to the fifth space S5 via the fifth supply path and the fourth space S4 is unpressurized, an axial force in the first axial direction is exerted on the flange of the second shift rod 32. Thus, the second shift rod 32 is shifted in the first axial direction until the flange abuts the second cover 381 of the second chamber 38. Consequently, the second shifting means 34 fixed to the second shift rod 32 shifts the second follower 14 in the first axial direction. As a result, the second shift fork 12 of the transmission 1 is shifted in the first axial direction and the second dog clutch 120 is engaged with the third gear 113.

When pressurized air is supplied to the fourth space S4 via the fourth supply path and the fifth space S5 is unpressurized, an axial force in the second axial direction is exerted on the flange of the second shift rod 32. Thus, the second shift rod 32 is shifted in the second axial direction until the flange abuts the axial end surface of the second chamber 38. As a result, the second shift rod 32 is returned to the position corresponding to the neutral position of the shift device 3 and the second dog clutch 120 is disengaged with the third gear 113.

Due to the arrangement and operation of the first and second shift rods 31, 32 described above, the pneumatically actuated shift device 3 can be made very compact in size. Thus, a size of the housing 36 of the pneumatically actuated shift device 3 can be achieved which substantially corresponds to a size of the housing 26 of the electrically actuated shift device 2. Moreover, the first and second shifting means 33, 34 can be positioned corresponding to the first and second shifting means 23, 24 of the electrically actuated shift device 2, i.e., along an axial direction. Thus, the first and second followers 13, 14 of the transmission 1 can be moved axially both by the rotation of the shifting shaft 21 of the electrically actuated shift device 2 with only one actuator (e.g., the stepper motor) and by the pneumatically actuated first and second shift rods 31, 32. Therefore, it is not necessary to adapt the transmission 1, in particular the first and second followers 13, 14 of the transmission 1, to the respective shift device 2, 3.

The above-described embodiments of the present invention can be appropriately modified or combined. The above description is not exhaustive, and the present invention is not limited to the above embodiments. The skilled person will recognize that various modifications and combinations of the features included in the above embodiments are possible within the scope of the invention. Accordingly, the scope of the invention should be determined from the accompanying claims.

What is claimed is:

1. A modular shifting system, comprising:
a transmission including an input shaft and an output shaft;
a transmission housing;
gear trains accommodated in the transmission housing and constituting at least two shiftable gear ratios for establishing a transmission ratio between the output shaft and the input shaft; and
a shift device for shifting between the at least two shiftable gear ratios;
wherein the shift device is a pneumatically actuated shift device and comprises:
a housing detachably attached to the transmission housing of the modular shifting system; and
a first shift rod and a second shift rod that are accommodated in the housing and configured to reciprocate in an axial direction, wherein the first shift rod is configured to shift a first follower of the transmission, the second shift rod is configured to actuate a second follower of the transmission, the first shift rod and the second shift rod are coaxial, the first shift rod extends through the second shift rod, and the second shift rod is slidable along the first shift rod.

2. The modular shifting system according to claim 1, wherein dimensions of the housing of the pneumatically actuated shift device are substantially equal to dimensions of a housing of an electrically actuated shift device that is interchangeable with the pneumatically actuated shift device and vice versa.

3. The modular shifting system according to claim 1, wherein
the transmission includes a first shift fork axially shiftable by axially shifting a first follower and a second shift fork axially shiftable by axially shifting the second follower, and
the first follower and the second follower protrude outside of the transmission housing.

4. The modular shifting system according to claim 1, wherein the first shift rod is coupled to a first shifting means configured to shift a first follower of the transmission, and the second shift rod is coupled to a second shifting means configured to shift a second follower of the transmission.

5. The modular shifting system according to claim 4, wherein
the first follower and the second follower protrude outside of the transmission housing.

6. The modular shifting system according to claim 4, wherein the first follower and the second follower extend into the housing of the shift device.

7. The modular shifting system according to claim 6 wherein
the first shift rod is radially supported by the housing so as to be slidably movable in the axial direction with respect to the housing, and
the second shift rod is radially supported by the first shift rod so as to be slidably movable in the axial direction with respect to the housing and with respect to the first shift rod.

8. The modular shifting system according to claim 7 wherein
the first shift rod and the second shift rod are axially movable independently of each other.

9. The modular shifting system according to claim 4, wherein the first shifting means comprises a circumferential recess radially recessed from a peripheral surface of the first shifting means towards an axial center and extending in a circumferential direction, and the second shifting means comprises a circumferential recess radially recessed from a peripheral surface of the second shifting means towards an axial center of the second shifting means and extending in the circumferential direction, wherein the circumferential recesses of the first and the second shifting means protrude outside of the housing of the shift device through an opening in the housing of the shift device.

10. The modular shifting system according to claim 1 wherein the housing of the shift device comprises a first chamber, the first shift rod comprises a first piston member and a second piston member arranged on an axial end portion of the first piston member, the first piston member divides the first chamber into a first space and a second space, and the second piston member divides the first chamber into the second space and a third space.

11. The modular shifting system according to claim 10 wherein the second piston member comprises an inner piston element and an outer piston element positioned on a radially outer side of the inner piston element, wherein the inner piston element abuts the first piston member and first piston member and the inner piston element are axially fixed to the first shift rod.

12. The modular shifting system according to claim 11 wherein the outer piston element comprises a sleeve, the sleeve comprises a flange projecting radially outward and a ring-shaped hook portion projecting radially inward, wherein the outer piston element is slidable along the inner piston element, axial movement of the outer piston element in a second axial direction relative to the inner piston element is restricted by the ring-shaped hook portion abutting a flange of the inner piston element, and axial movement of the outer piston element in a first axial direction relative to the inner piston element is restricted by the ring-shaped hook portion abutting the first piston member.

13. The modular shifting system according to claim 1 wherein the housing of the shift device comprises a second chamber, a second cover is disposed on the housing and covers an opening of the second chamber in an airtight manner, and the second shift rod is partially disposed in the second chamber and passes through a hole in the second cover and so that an axial end portion of the second shift rod projects out of the second chamber, wherein the second shift rod comprises a flange that divides the second chamber into a fourth space and a fifth space.

14. A modular shifting system, comprising:

a transmission including an input shaft and an output shaft;

a transmission housing;

gear trains accommodated in the transmission housing and constituting at least two shiftable gear ratios for establishing a transmission ratio between the output shaft and the input shaft; and shift devices detachably attachable to the transmission housing for shifting between the at least two shiftable gear ratios;

wherein the shift devices comprise an electrically actuated shift device and a pneumatically actuated shift device, respectively, and the modular shifting system is configured such that the electrically actuated shift device is interchangeable with the pneumatically actuated shift device and vice versa;

wherein the pneumatically actuated shift device comprises a housing detachably attachable to the transmission housing of the modular shifting system, a first pneumatically actuated shift rod configured to reciprocate in an axial direction and accommodated in the housing, and a second pneumatically actuated shift rod configured to reciprocate in the axial direction and accommodated in the housing, wherein the first pneumatically actuated shift rod is coupled to a first shifting means configured to shift a first follower of the transmission, the second pneumatically actuated shift rod is coupled to a second shifting means configured to shift a second follower of the transmission, the first pneumatically actuated shift rod and the second pneumatically actuated shift rod are co-axial, and the first pneumatically actuated shift rod of the pneumatically actuated shift device axially penetrates the second pneumatically actuated shift rod.

* * * * *